United States Patent
Cao et al.

(10) Patent No.: US 11,983,220 B2
(45) Date of Patent: *May 14, 2024

(54) KEY-VALUE STORAGE FOR URL CATEGORIZATION

(71) Applicant: Palo Alto Networks, Inc., Santa Clara, CA (US)

(72) Inventors: Wei Cao, San Jose, CA (US); Dao-Chen Zheng, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,511

(22) Filed: Nov. 30, 2022

(65) Prior Publication Data

US 2023/0108362 A1    Apr. 6, 2023

Related U.S. Application Data

(63) Continuation of application No. 16/543,147, filed on Aug. 16, 2019, now Pat. No. 11,580,163.

(51) Int. Cl.
| | |
|---|---|
| G06F 7/00 | (2006.01) |
| *G06F 16/901* | (2019.01) |
| *G06F 16/906* | (2019.01) |
| *G06F 16/955* | (2019.01) |
| *H04L 9/40* | (2022.01) |

(52) U.S. Cl.
CPC ...... *G06F 16/9014* (2019.01); *G06F 16/9027* (2019.01); *G06F 16/906* (2019.01); *G06F 16/9566* (2019.01); *H04L 63/0236* (2013.01)

(58) Field of Classification Search
CPC .............. G06F 16/9014; G06F 16/906; G06F 16/9566; G06F 16/9027; H04L 63/0236; H04L 63/101
USPC ................ 707/727, 747, 750, 736, 737, 741
See application file for complete search history.

(56) References Cited

U.S. PATENT DOCUMENTS

| | | | |
|---|---|---|---|
| 7,213,069 | B2 | 5/2007 | Anderson |
| 8,108,404 | B2 | 1/2012 | Sylthe |
| 8,131,271 | B2 | 3/2012 | Ramer |
| 8,190,611 | B1 | 5/2012 | Nachenberg |
| 8,578,443 | B2 | 11/2013 | Narain |

(Continued)

FOREIGN PATENT DOCUMENTS

| | | |
|---|---|---|
| CN | 103176900 | 1/2016 |
| EP | 1388091 | 2/2004 |

(Continued)

OTHER PUBLICATIONS

Larsson et al., Faster Suffix Sorting, pp. 1-20, 1999.

*Primary Examiner* — Md I Uddin
(74) *Attorney, Agent, or Firm* — Van Pelt, Yi & James LLP

(57) ABSTRACT

A URL and a categorization associated with the URL are received. The received URL comprises a hostname portion and a path portion. The hostname portion of the received URL comprises a plurality of segments separated by one or more delimiters. A key associated with the received URL is determined. An operation is performed on a database using the determined key. Examples of such operations include inserting the categorization into the database, changing a value associated with the key in the database, removing a key-value pair from the database, and querying the database.

18 Claims, 12 Drawing Sheets

(56) References Cited

U.S. PATENT DOCUMENTS

| | | |
|---|---|---|
| 8,769,524 B2 | 7/2014 | Bhullar |
| 8,805,339 B2 | 8/2014 | Ramer |
| 8,819,772 B2 | 8/2014 | Bettini |
| 8,839,266 B1 | 9/2014 | Partridge |
| 8,843,153 B2 | 9/2014 | Luna |
| 8,949,370 B1 | 2/2015 | Wu |
| 9,003,393 B2 | 4/2015 | Bhullar |
| 9,027,140 B1 | 5/2015 | Watkins |
| 9,058,490 B1 | 6/2015 | Barker |
| 9,143,522 B2 | 9/2015 | Wang |
| 9,152,694 B1 | 10/2015 | Padidar |
| 9,178,852 B2 | 11/2015 | Bettini |
| 9,203,864 B2 | 12/2015 | Luna |
| 9,246,938 B2 | 1/2016 | Alme |
| 9,247,386 B2 | 1/2016 | Kau |
| 9,294,500 B2 | 3/2016 | Mahaffey |
| 9,311,386 B1 | 4/2016 | Song |
| 9,374,386 B2 | 6/2016 | Watkins |
| 9,378,465 B2 | 6/2016 | Stewart |
| 9,418,126 B2 | 8/2016 | Shaik |
| 9,419,989 B2 | 8/2016 | Harris |
| 9,426,209 B2 | 8/2016 | Marar |
| 9,529,927 B2 | 12/2016 | Gang |
| 9,756,094 B1 | 9/2017 | Lewis |
| 9,806,942 B2 | 10/2017 | Saxena |
| 9,898,469 B1 | 2/2018 | Dorin |
| 10,079,876 B1* | 9/2018 | Chung ................ H04W 12/08 |
| 10,284,570 B2 | 5/2019 | Schmidtler |
| 10,621,203 B2* | 4/2020 | Hunt ..................... G06F 16/283 |
| 10,698,916 B1* | 6/2020 | Levy ..................... G06F 16/245 |
| 2003/0110168 A1 | 6/2003 | Kester |
| 2005/0235030 A1* | 10/2005 | Lauckhart ......... G06Q 30/0246 |
| | | 709/200 |
| 2008/0040389 A1 | 2/2008 | Seth |
| 2009/0063538 A1 | 3/2009 | Chitrapura |
| 2009/0089278 A1 | 4/2009 | Poola |
| 2009/0240684 A1 | 9/2009 | Newell |
| 2011/0191342 A1 | 8/2011 | Cohen |
| 2011/0191849 A1 | 8/2011 | Jayaraman |
| 2012/0079055 A1 | 3/2012 | Robinson |
| 2012/0311659 A1 | 12/2012 | Narain |
| 2012/0324568 A1 | 12/2012 | Wyatt |
| 2013/0097706 A1 | 4/2013 | Titonis |
| 2013/0183951 A1 | 7/2013 | Chien |
| 2014/0006517 A1 | 1/2014 | Hsiao |
| 2014/0040017 A1 | 2/2014 | Bafna |
| 2014/0040231 A1 | 2/2014 | Lin |
| 2014/0096024 A1 | 4/2014 | Laurent |
| 2014/0129733 A1 | 5/2014 | Klais |
| 2014/0310770 A1 | 10/2014 | Mahaffey |
| 2014/0324741 A1 | 10/2014 | Stewart |
| 2014/0331281 A1 | 11/2014 | Bettini |
| 2014/0342691 A1 | 11/2014 | Kalavade |
| 2015/0033341 A1 | 1/2015 | Schmidtler |
| 2015/0067853 A1 | 3/2015 | Amrutkar |
| 2015/0081617 A1 | 3/2015 | Shaik |
| 2015/0156061 A1 | 6/2015 | Saxena |
| 2015/0161282 A1 | 6/2015 | Low |
| 2015/0242637 A1 | 8/2015 | Tonn |
| 2015/0302182 A1 | 10/2015 | Wyatt |
| 2015/0356196 A1* | 12/2015 | Sreenivas Prasad ... H04L 67/02 |
| | | 707/740 |
| 2015/0356451 A1 | 12/2015 | Gupta |
| 2015/0365407 A1 | 12/2015 | Jagana |
| 2016/0012213 A1 | 1/2016 | Walsh |
| 2016/0012220 A1 | 1/2016 | Padidar |
| 2016/0050226 A1 | 2/2016 | Bettini |
| 2018/0007090 A1* | 1/2018 | Cao ..................... H04L 63/101 |
| 2018/0025157 A1 | 1/2018 | Titonis |

FOREIGN PATENT DOCUMENTS

| | | |
|---|---|---|
| WO | 2011069255 | 6/2011 |
| WO | 2013116856 | 8/2013 |
| WO | 2014003872 | 1/2014 |
| WO | 2017074401 | 5/2017 |

* cited by examiner

[1] "com" →parent ◯
   Key:   com
   Value: [".paloaltonetworks", ".asite"]

[2] ".paloaltonetworks" →parent (com)
   Key:   com.paloaltonetworks
   Value: [".wildfire"]

[3] ".wildfire" →parent (com.paloaltonetworks)
   Key:   com.paloaltonetworks.wildfire
   Value: ["/test"]

[4] "/test" →parent (com.paloaltonetworks.wildfire)
   Key:   com.paloaltonetworks.wildfire/test
   Value: ["/website.php"]

[5] "/website.php" →parent (com.paloaltonetworks.wildfire/test)
   Key:   com.paloaltonetworks.wildfire/test/website.php
   Value: []

FIG. 4B

|       | Name     |
|-------|----------|
| Key   | hash key |
| Field 1 | dchn   |
| Field 2 | chn    |
| Field 3 | cat    |
| Field 4 | szbmp  |
| Field 5 | bmp    |
| Field 6 | vbmp   |
| Field 7 | exp    |
| Field 8 | tstmp  |
| Field 9 | cflag  |
| Field 10 | ch300 |
| Field 11 | ch(x) |

FIG. 6

```
"com"

"com.ab"

"com.ab.c1"

"com.ab.c1/p1"

"com.ab.c1/p1/p2"

"com.ab.c1/p1/p2/p3"

"com.ab.c1/p1/p2/p3/p4"
```

FIG. 9

KEY-VALUE STORAGE FOR URL CATEGORIZATION

CROSS REFERENCE TO OTHER APPLICATIONS

This application is a continuation of U.S. patent application Ser. No. 16/543,147 entitled KEY-VALUE STORAGE FOR URL CATEGORIZATION filed Aug. 16, 2019 which is incorporated herein by reference for all purposes.

BACKGROUND OF THE INVENTION

Firewalls and other security devices/programs typically enforce policies against network traffic based on a set of rules. In some cases, the rules may be based on uniform resource locator (URL) information, such as by preventing a user from accessing a site reachable at specific URL (e.g., denying access to http://www.example.com), or by preventing a user from accessing a site based on a categorization of the URL (e.g., denying access to sites classified as "social networking" sites or "pornographic" sites). Unfortunately, due to a variety of factors, such as the sheer volume of URLs in existence, as well as the dynamic nature of content, it can be difficult to efficiently enforce rules that make use of URL information.

BRIEF DESCRIPTION OF THE DRAWINGS

Various embodiments of the invention are disclosed in the following detailed description and the accompanying drawings.

FIG. 4B illustrates key/value pairs for the URL.

FIG. 6 illustrates an embodiment of a URL categorization key value data structure

FIG. 9 illustrates a set of database keys that can be generated from an example URL.

DETAILED DESCRIPTION

Figure 1:
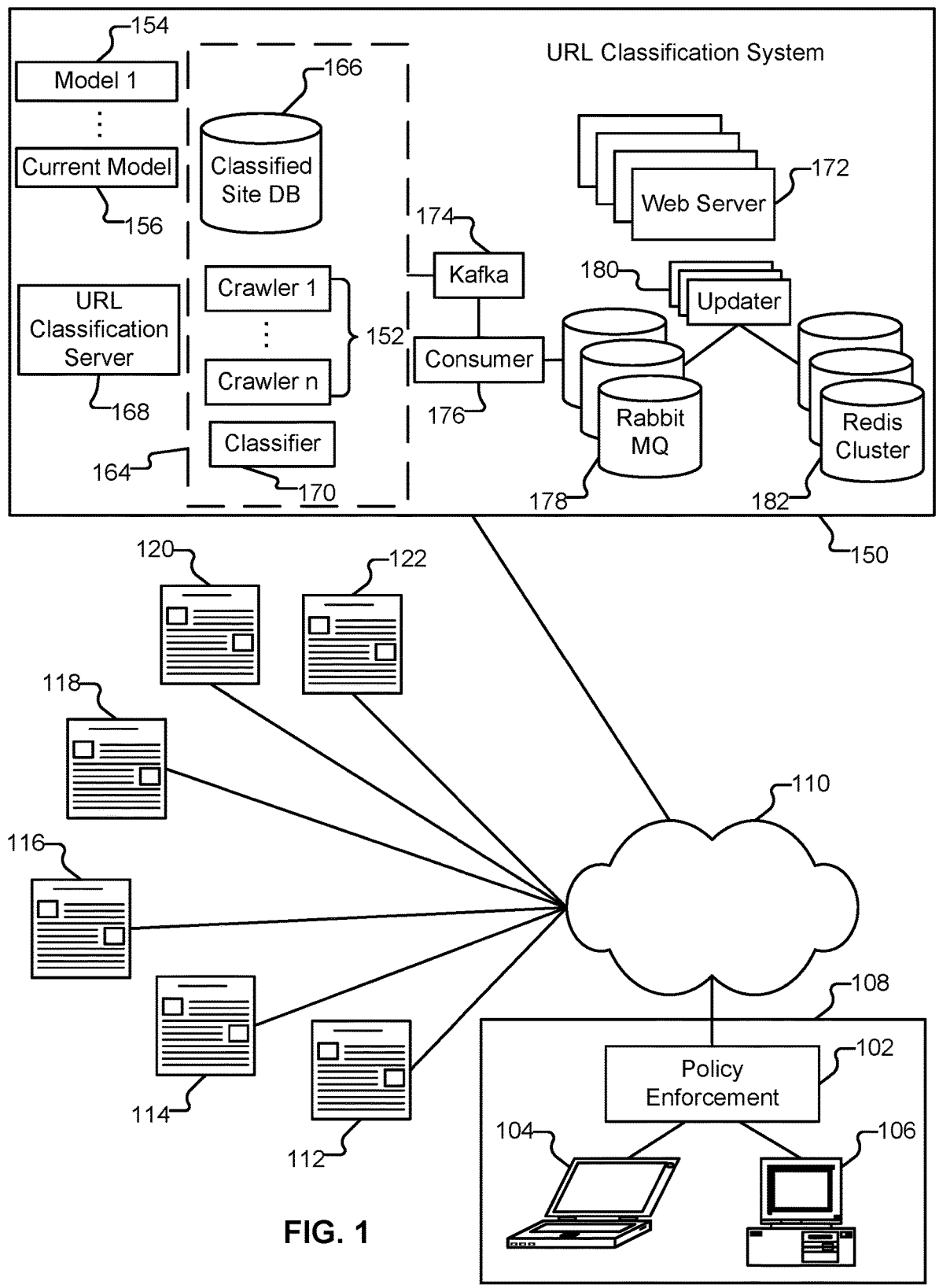
FIG. 1 illustrates an example of an environment in which policies that include Universal Resource Locator information are enforced.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which policies that include Universal Resource Locator (URL) information are enforced. In the example shown in FIG. 1, clients 104 and 106 are a laptop computer and desktop computer, respectively, present in an enterprise network 108. Policy enforcement appliance 102 (also referred to herein as "appliance 102") is configured to enforce policies regarding communications between clients, such as clients 104 and 106, and nodes outside of enterprise network 108 (e.g., reachable via external network 110). One example of a policy is a rule prohibiting any access to site 112 (a pornographic website) by any client inside network 108. Another example of a policy is a rule prohibiting access to social networking site 114 by clients between the hours of 9 am and 6 pm. Yet another example of a policy is a rule allowing access to streaming video website 116, subject to a bandwidth or other consumption constraint. Access to other sites (e.g., news site 118) can be explicitly permitted (e.g., a rule allowing access to site 118 via URL ("www.examplenews.com") or category ("news")), and can also be permitted by virtue of not being prohibited (e.g., "access to any site not prohibited is allowed"). Other types of policies can also be enforced, such as ones governing traffic shaping, quality of service, or routing with respect to a given URL, pattern of URLs, category of URL, or other URL information. In various embodiments, policy enforcement appliance 102 is also configured to enforce policies with respect to traffic that stays within enterprise network 108.

The functionality provided by policy enforcement appliance 102 can be implemented in a variety of ways. Specifically, policy enforcement appliance 102 can be a dedicated device or set of devices. The functionality provided by appliance 102 can also be integrated into or executed as software on a general purpose computer, a computer server, a gateway, and/or a network/routing device. Further, whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

Also shown in FIG. 1 is a URL classification system 150. URL classification system 150 uses a set of crawlers 152 to crawl sites (e.g., sites 112-122), extract metadata/content, and store information associated with the crawled sites (including the time of the crawl) in database 166. Where multiple crawls of a site are performed, the historical crawl information (e.g., results of the first crawl, second crawl, etc.) are preserved in database 166, along with results of the current crawl. Examples of tools that can be used to crawl/extract content from sites include PageDump (WebKit), HtmlUnit, and jsoup. Database 166 is, in various embodiments, implemented using MongoDB. Example tables that can be included in database 166 are a crawl queue (of sites to be crawled), a crawl log (a history of sites crawled), a classification result (a to-publish category, invalid site, or no category), and a crawl content report (a summary of crawled sites, language, and number of pages crawled). The information extracted for a site (e.g., title, description, body text, keywords, inlinks, outlinks, language, etc.) is used (e.g., by classifier 170) to generate a feature vector (or set of feature vectors, as applicable). One example of a feature is whether or not any of the outlinks of a site lead to sites known to be classified as ADULT sites. Other example features variously include features related to body text, features related to metadata, features related to incoming links, and features related to the URL itself.

In various embodiments, different features included in a feature vector are used in conjunction with different types of machine learning approaches incorporated into a classification model, such as model 156. Examples of such machine learning approaches include Naïve Bayes, support vector machines, random forest, logistic regression, and gradient descent boosting trees. Classifier 170 uses a model, such as model 156, to classify a given site (e.g., as NEWS, ADULT, etc.) based on its associated feature vector. In various embodiments, a model such as model 156 is trained using a training set of manually labeled websites. Categorizations determined using model 156 are stored in database 166. The contents of database 166 can be used for a variety of purposes, including generating database 312 discussed in conjunction with FIG. 3, and responding to queries (e.g., with URL classification server 168 being an example of remote URL classification server 320, responding to queries by consulting database 166). As will be described in more detail below, other approaches can also be used to respond to queries (e.g., instead of or in addition to using embodiments of URL classification server 168 and database 166).

In various embodiments, system 150 is implemented using commodity server-class hardware. System 150 can also be constructed using a scalable, elastic architecture, and may comprise several distributed components, including components provided by one or more third parties (e.g., using Amazon Web Services, Microsoft Azure, and/or Google Cloud Platform). Further, when system 150 is referred to as performing a task, such as storing data or processing data, it is to be understood that a sub-component or multiple sub-components of system 150 (whether individually or in cooperation with third party components) may cooperate to perform that task. Unless otherwise specified, various logical components of system 150 are generally implementable in a variety of ways, including as a set of one or more scripts (e.g., written in Java, python, etc., as applicable).

Figure 2:
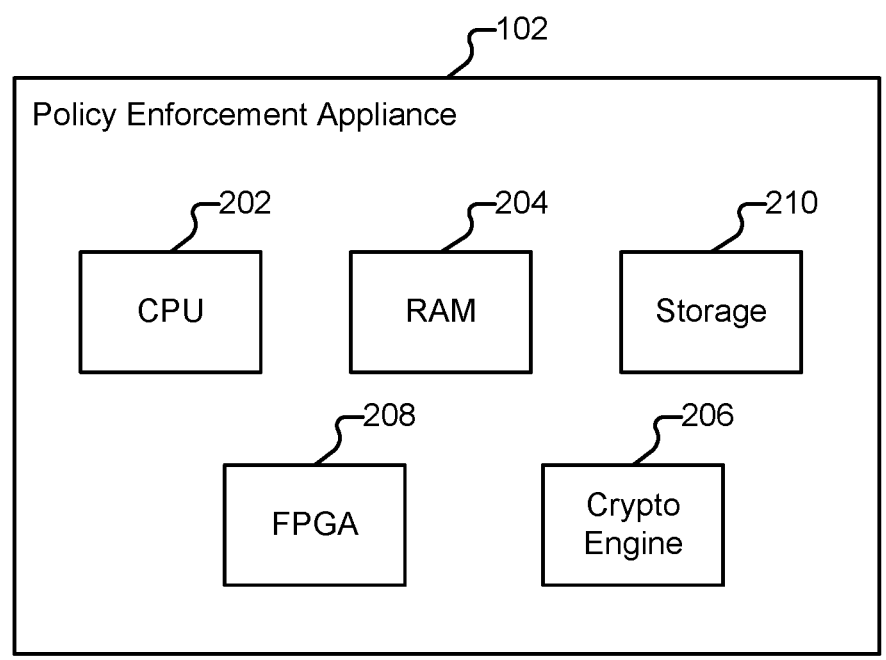
FIG. 2 illustrates an embodiment of a policy enforcement appliance.

FIG. 2 illustrates an embodiment of a policy enforcement appliance. The example shown is a representation of physical components that are included in appliance 102, in some embodiments. Specifically, appliance 102 includes a high performance multi-core CPU 202 and RAM 204. Appliance 102 also includes a storage 210 (such as one or more disk drives), which is used to store policy and other configuration information, as well as URL information. Appliance 102 can also include one or more optional hardware accelerators. For example, appliance 102 can include a cryptographic engine 206 configured to perform encryption and decryption operations, and one or more FPGAs 208 configured to perform matching, act as network processors, and/or perform other tasks.

Figure 3:
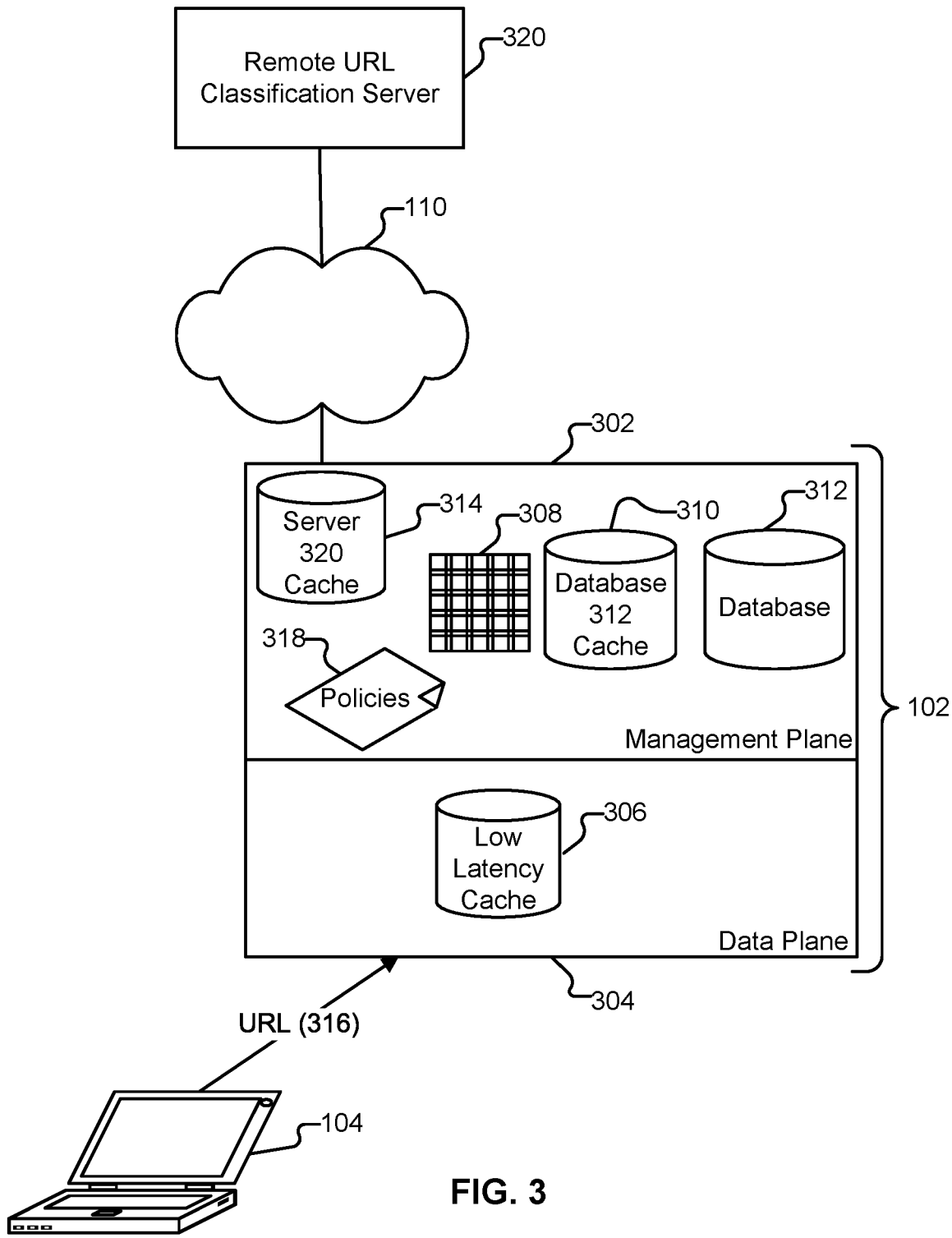
FIG. 3 illustrates an embodiment of a policy enforcement appliance.

FIG. 3 illustrates an embodiment of a policy enforcement appliance. In the example shown, the functionality of policy enforcement appliance 102 is implemented in a firewall. Specifically, appliance 102 includes a management plane 302 and a data plane 304. The management plane is responsible for managing user interactions, such as by providing one or more user interfaces for configuring policies (318), reporting problems, and viewing log data. The data plane is responsible for managing data, such as by performing packet processing (e.g., to extract URLs) and session handling. In various embodiments, a scheduler is responsible for managing the scheduling of requests (e.g., as presented by data plane 304 to management plane 302, or as presented by management plane 302 to a remote URL classification server 320).

One task performed by the firewall is URL filtering. Suppose network 108 belongs to a company, hereinafter referred to as "ACME Corporation." Specified in appliance 102 are a set of policies 318, some of which govern the types of websites that ACME employees may access, and under what conditions. As one example, included in appliance 102 is a policy that permits employees to access news-related websites. Another policy included in appliance 102 prohibits, at all times, employees from accessing pornographic websites. Also included in appliance 102 is a database (312) of URLs and associated categories. Other information can also be associated with the URLs in database 312 instead of or in addition to category information, and that other information can be used in conjunction with policy enforcement.

In some embodiments, database 312 is provided by a third party, such as through a subscription service. In such a scenario, it is possible that instead of the URLs being directly stored in database 312, a transformation is applied to the URLs prior to storage. As one example, MD5 hashes of URLs can be stored in database 312, rather than the URLs themselves. The URLs stored in database 312 (or transformations thereof) represent the top n URLs for which access is most likely to be sought by users of client devices, such as client 104, where n can be configured based on the computing and other resources available to appliance 102. As one example, an embodiment of database 312 includes 20 million URLs and is stored in storage 210. In various embodiments, one or more bloom filters are used by appliance 102 for URL lookups. For example, bloom filter 308 can be compiled from the contents of database 312 and loaded into RAM 204. In some embodiments, the bloom filter is compiled as a bitmask. Whenever changes are made to database 312 (e.g., as an update provided by a vendor), bloom filter 308 is recompiled. Also included in the firewall are various caches (e.g., 306, 310, and 314), also loaded into RAM 204. In some embodiments, all or some of bloom filter 308 and/or caches 306, 310, and 314 are omitted from appliance 102 and the processing described herein is adapted accordingly. In other embodiments, additional bloom filters and/or additional caches are included in appliance 102, as applicable. Additional detail regarding components shown in FIG. 3 will be provided below.

When a user of client 104 (an employee referred to hereinafter as "Alice") attempts to engage in activities, such as web surfing, communications from and to client 104 pass through policy enforcement appliance 102. As one example, suppose Alice has launched a web browser application on client 104 and would like to visit an arbitrary web page. Appliance 102 is configured to evaluate the URL of the site Alice would like to visit (e.g., URL 316) and determine whether access should be permitted.

Suppose Alice would like to visit site 118, the website of a national newspaper, and enters that URL into her browser ("www.examplenews.com"). In some embodiments, the URL (316) is evaluated by appliance 102 as follows. In the first stage of the evaluation, the data plane 304 consults cache 306 for the presence of URL 316 (the results of which are indicative of whether appliance 102 has previously received a request to access site 118 within cache resource constraints). If the URL is present in cache 306, the associated category that is also stored in cache 306 is used to enforce any applicable policies 318 (e.g., allowing Alice access to site 118). If the URL is not present in cache 306, a temporary entry is inserted into cache 306 indicating that the URL is being resolved. As one example, a URL being resolved is assigned a temporary category of "UNRESOLVED." Additional requests received by appliance 102 for access to site 118 (e.g., received from another user such as "Bob," a user of device 106) will be queued pending the resolution. In various embodiments, a timeout condition is placed on UNRESOLVED entries included in cache 306, such that if the entry is not updated within a specified period of time, the entry is removed.

Assuming URL 316 remains unresolved, data plane 304 sends a request to management plane 302 for an evaluation of URL 316. The next stage of evaluation is for management plane 302 to perform a match against bloom filter 308. URL 316 is transformed as applicable (e.g., an MD5 hash of URL 316 is computed). For the remainder of the discussion of this example, no distinction will be made between a URL and the MD5 (or other transformation) of a URL, to aid in clarity. It is to be assumed that if database 312 stores MD5 hashes, the queries performed against it (and the corresponding bloom filter and queries against the bloom filter) will be performed using MD5 (or other applicable) transformations of URLs.

A REJECT response, if received from bloom filter 308 for URL 316, indicates with 100% confidence that URL 316 is not present in database 312. An ACCEPT response indicates that URL 316 is present in database 312, subject to a given false positive rate. The desired false positive rate of bloom filter 308 is configurable and is in some embodiments set at 10%, meaning that an ACCEPT response indicates, with 90% confidence, that the URL is present in database 312. Suppose that a match against bloom filter 308 for URL 316 is performed and the bloom filter reports an ACCEPT (i.e., there is a 90% chance that URL 316 is present in database 312). In some embodiments, cache 310 is evaluated for the presence of URL 316 (indicative of whether database 312 was previously queried for URL 316 within cache resource constraints). Suppose URL 316 is not present in cache 310. A query of database 312 is performed using URL 316. If it is assumed that URL 316 is present in database 312, the corresponding category NEWS is returned and ultimately provided to data plane 304, which will update the entry in cache 306 by changing the UNRESOLVED category to NEWS. The category will be used by the firewall to enforce any applicable rules. In this case, for example, Alice's attempt to access URL 316 with her browser will be allowed, because her request has been associated with an attempt to access a NEWS site, which is a permissible use. Cache 310 is also updated to include the returned category and URL 316 (i.e., its MD5 hash).

Now suppose that instead of reporting an ACCEPT, bloom filter 308 either reports a REJECT (indicating with 100% certainty that URL 316 is not present in database 312), or that the ACCEPT reported by bloom filter 308 was a false positive (i.e., a query of database 312 for URL 316 fails). The next phase of evaluation performed by the management plane (in either case) is to consult cache 314 to see if URL 316 is present therein. Cache 314 is associated with queries performed by appliance 102 against a set of one or more remote URL classification servers. As with the previous phases, if URL 316 is present in cache 314, the corresponding category (e.g., "NEWS") will be returned as a result and can be used by the firewall in policy enforcement (and included in cache 306). If URL 316 is also absent in cache 314, one or more remote URL classification servers is queried. One example implementation of a remote URL classification server is URL classification server 320, an Amazon Cloud URL query server, which queries URL category information using a Trie structure lookup. In some embodiments, URL classification server 320 is made available by the provider of the contents of database 312, and contains URL information that supplements the information included in database 312 (e.g., by including many millions of additional URLs and corresponding categories). As one example, URL classification server 320 can be provided by URL classification system 150 (e.g., as component 168). In various embodiments, URL classification server 168 is configured to respond to received requests (e.g., made by appliance 102) with a per-query classification (e.g., by responding to a query for "www.examplenews.com" with "news"). Any additional lookups for the site (e.g., "www.examplenews.com/adult" which might host adult-oriented content within the site) will require additional queries. As will be described in more detail below, another example of URL classification server 320 is web server 172. In various embodiments, web server 172 is part of a cluster of web servers, each of which is configured to respond to received requests with a Trie or other data structure that can help data appliance classify additional URLs without needing to submit additional queries to web server 172.

URL classification server 320 can also be under the control of the owner of appliance 102 or any other appropriate party. Further, a set of multiple URL classification servers can be queried by appliance 102, whether in parallel, in sequence (e.g., if a first queried URL classification server has no results, appliance 102 contacts a different URL classification server), selectively, etc. In various embodiments, a bloom filter corresponding to the data stored by URL classification server 320 is included in appliance 102.

In the event that URL 316 is also absent from URL classification server 320 (and any additional URL servers available to appliance 102 as applicable), a category of UNKNOWN will be returned and appropriate policies applied, based on the category, such as by blocking access to URL 316. Cache 306 can also be updated by switching the temporary category of UNRESOLVED to UNKNOWN. As with cache 310, cache 314 is updated based on results returned by URL classification server 320. In some embodiments, URLs with UNKNOWN categorization have a timeout, thus allowing for resolution of the categorization during a subsequent request.

III. Improving Efficiency of URL Lookups

Maintaining a complete and up-to-date copy of all known URLs and classifications (e.g., by replicating database 166 as database 312) on a policy enforcement appliance such as appliance 102 is generally infeasible. While an appliance such as appliance 102 can store categorization information for some of the most frequently used URLs (e.g., in database 312), appliance 102's resources are finite. Accordingly, and as mentioned above, in various embodiments, appliance 102 is configured to query a remote classification server (e.g., URL classification server 320) in real-time (e.g., when it is unable to determine URL categorization information for a particular request).

Three drawbacks of appliance 102 querying the remote URL classification server 320 are latency, memory limitations, and cache efficiency. Each query submitted by appliance 102 will take some amount of time—both in terms of network/bandwidth speeds and the amount of time URL classification server 320 requires to determine a response to the query. Visiting a single web site often involves fetching and loading content from tens or hundreds of distinct URLs. Reducing the number of remote queries made by appliance 102 to URL classification server 320 can reduce latency and improve user experience. Further, the memory and cache resources available on appliance 102 are finite. Limiting unnecessary information from being stored using these resources will improve performance as well.

A. Data Model

1. URL Structure

A URL is a well-defined data structure. It is a string that can be divided by pre-defined delimiters into different meaningful parts (also referred to herein as "words") comprising a hostname, path, and (optionally) parameters. Both the hostname and path can be divided into "words" using a set of delimiters. An example URL is wildfire.paloaltonetworks.com/test/we site.php a. Hostname:
   "." is used to separate the host string into words.
   "/", "?", "#" are used as separators between the hostname and path.
   From right to left, the hostname becomes more specific. For example, "wildfire.paloaltonetworks.com" is more specific than "paloaltonetworks.com".
   b. Path:
   "/" is used to separate the path string into words.
   "?" and sometimes "#" are used as the separator between the path and parameters.
   From left to right, the path becomes more specific. For example, "/test/website.php" is more specific than"/test/".
   c. Parameters:
   Any characters appearing after "?" (or appearing after "#" if "?" is not present) are treated as a single word.

2. Representing URLs Using a Word Based Suffix Tree

By reverting the hostname into octets, the URL can be written as:
   com.paloaltonetworks.wildfire/test/website.php By rewriting the URL in this manner, a parent-child relationship can be established from left to right:
   "com.paloaltonetwork" is the parent of "com.paloaltonetwork.wildfire"
   "com.paloaltonetwork.wildfire" is the parent of "com.paloaltonetwork.wildfire/samples"
   "com.paloaltonetwork.wildfire/samples" is the parent of "com.paloaltonetwork.wildfire/samples/status.php"

Each URL can only have up to one parent. However, a given URL can have multiple children. Further, while one URL (e.g., "paloaltonetwork.com") can have a very large number of child URLs, for a typical website, many of the child URLs will share the same category as their common parents, with a relatively small number of exceptions.

A trie can be efficiently used to store URL categorization information. One example of a trie is a suffix tree, which will generally be used in following examples and discussions and be used interchangeably with the term, "trie." Other types of tries can also be used, in various embodiments, as applicable.

Figure 4A:
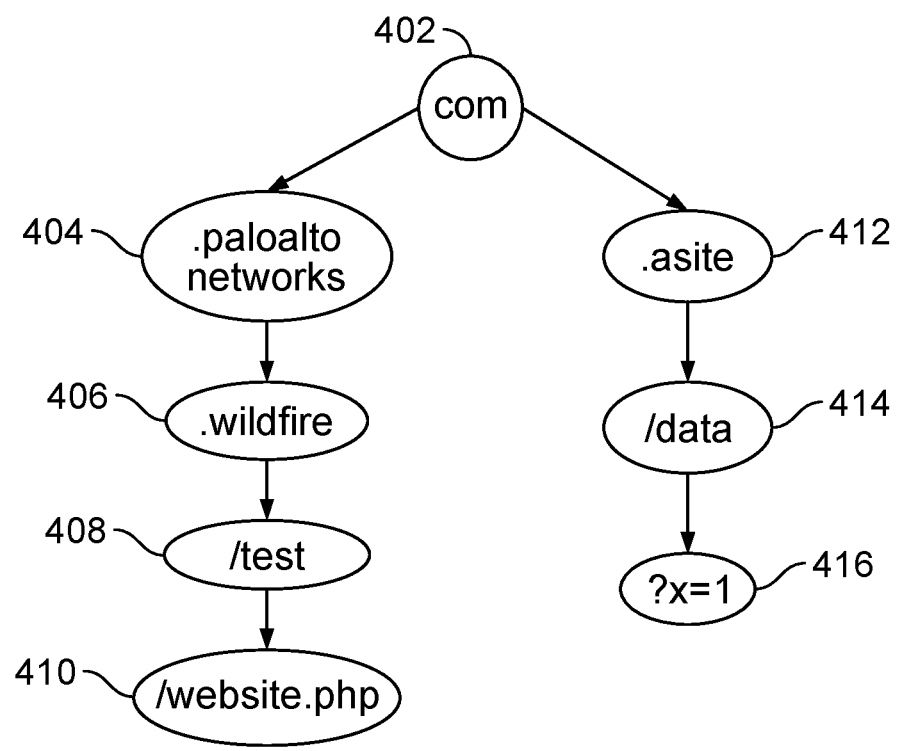
FIG. 4A depicts an example of a word based suffix tree.

FIG. 4A depicts an example of a word based suffix tree. Two URLs, "wildfire.paloaltonetworks.com/test/website.php" and "asite.com/data/?x=1" have been inserted into the tree. In particular, their respective hostnames were reversed and then the URL was separated into a word list where the separator information is carried by the child word. Words stay ordered from left to right. Thus, "com.paloaltonetworks.wildfire/test/website.php" becomes nodes 402 (.com), 404 (.paloaltonetworks), 406 (.wildfire), 408 (/test), and 410 (/website.php), respectively. Similarly, "com.asite/data/?x=1" becomes nodes 402 (.com), 412 (.asite), 414 (/data), and 416 (?x=1).

In this example, two websites (paloaltonetworks.com and asite.com) are present as children under .com. In some embodiments, due to the sheer number of domains that share a common top level domain (TLD) such as ".com" or ".org," the TLD of a domain is appended to the highest level portion of the hostname (e.g., com.paloaltonetworks or com.asite) when forming the suffix. The combination of the TLD and highest level portion of a domain name is also referred to herein as a "TLD+1."

As will be described in more detail below, by storing URL category information in a suffix tree data structure, remote URL classification server 320 can include the entire suffix tree for a web site when responding to a query for a URL within the web site. After receiving such a response, appliance 102 will possess the complete URL category information for the web site and does not need to send further queries for this web site until the information expires. This greatly reduces the number of queries appliance 102 has to send to remote URL classification server 320 and thus eliminates the latency such additional queries would have added.

Some websites may have a large number of URLs whose categories differ from their parents' categories. Two examples include tumblr.com and reddit.com. In such a scenario it may not be feasible nor desirable for remote URL classification server 320 to include the entire suffix tree for the site, due to the large amount of data that needs to be compiled into the response, transmitted to appliance 102, and processed and stored by appliance 102. It will also likely be a waste of resources for the client to store all these URLs because, more likely than not, the client will only need the category information for a small fraction of these URLs. As will be described in more detail below, in various embodiments, remote URL classification server 320 can limit the number of child URLs that will be included in the suffix tree.

3. Translating a URL Based Suffix Tree to Key/Value Pairs

In a word based suffix tree, each node's (word's) parent is deterministic. Each node's (word's) immediate children can be acquired through a direct lookup. The key is the full path to visit a node, which carries the parent information. The immediate child information for a node is stored in the value of the key. FIG. 4B illustrates key/value pairs for the URL "wildfire.paloaltonetworks.com/test/website.php" (which has had the octets of its hostname reversed) with reference to the suffix tree depicted in FIG. 4A.

In a suffix tree for a given website, each node represents a URL. Even though a URL can have any number of child URLs, child nodes need not be created in the tree for those child URLs that have the same category as their closest parent. Instead, child nodes are only created for those child URLs (also referred to herein as "exceptions") that have different categories from their parent. As a result, the suffix tree for most websites will have a small number of nodes.

Figure 4C:
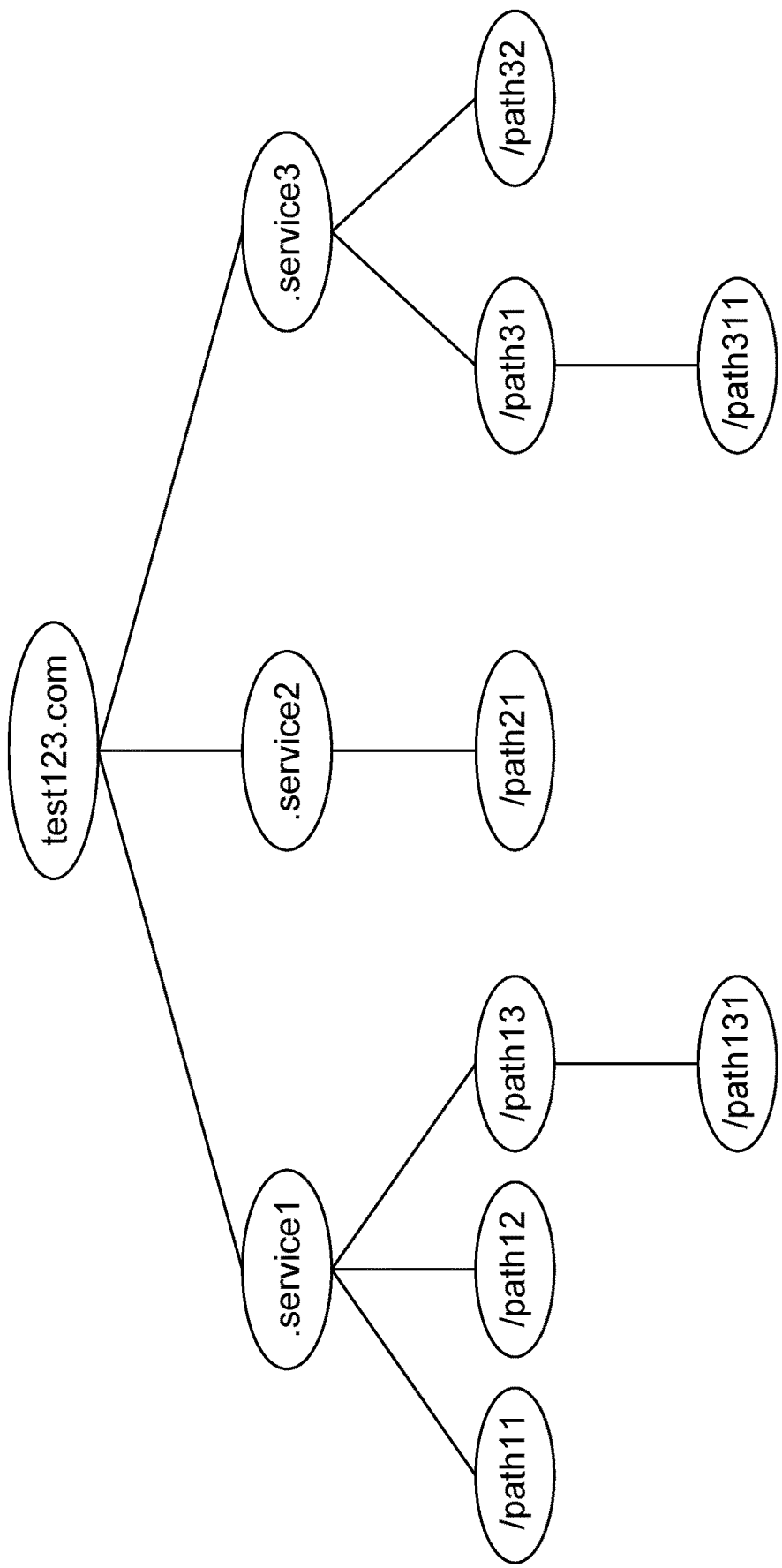
FIG. 4C illustrates an example of a suffix tree for a domain.

FIG. 4C illustrates an example of a suffix tree for a domain. In the example shown, the domain (test123.com) has a variety of nodes corresponding to the following URLS:
test123.com
service1.test123.com, service1.test123.com/path11, service1.test123.com/path12, service1.test123.com/path13, service1.test123.com/path131
service2.test123.com, service2.test123.com/path21
service3.test123.com, service3.test123.com/path31, service3.test123.com/path311, service3.test123.com/path32

In the example shown in FIG. 4C, test123.com has a total of twelve total children and three direct children. Similarly, service3.test123.com has a total of four children and two direct children.

B. Implementing Word Based Suffix Tree Infrastructure

Returning to FIG. 1, as previously mentioned, in various embodiments when policy enforcement appliance 102 does not have local categorization information for a URL, it sends a query to URL classification server 168. In some embodiments, URL classification server 168 is configured to accept a single request for a single URL categorization (e.g., what is the category of "www.example.com/joe/kittens.html"?) and respond with the category (e.g., "pets") after querying database 166. A drawback of this approach is that performance will generally degrade the more requests are received. If policy enforcement appliance 102 is the only device submitting queries to URL classification server 168, performance may be acceptable. In practice, however, many such devices will likely submit many queries to URL classification server 168 simultaneously, and latency will be added as a result.

An alternate approach is for URL classification system 150 to leverage a set of web servers (including web server 172), each of which can respond to queries submitted by policy enforcement engines. One potential downside of this approach is that, without replicating the contents of database 166, performance/latency may again become problematic if multiple web servers submit multiple queries to database 166. One approach to addressing the situation is for each web server (e.g., an NGINX instance) to have its own copy of database 166. One potential drawback of this approach is that the size of the copy of database is limited by the memory available to the instance. In an example embodiment, a database of 190 URL classifications requires approximately 48G of memory. Another potential drawback of this approach is that data consistency is problematic. For example, as new URLs and classifications are determined by crawler infrastructure 164, each of the copies of database 166 will need to be updated, which can be challenging to coordinate. And, if a particular instance of database 166 misses such an update, it will lead to inconsistent answers (e.g., with a first webserver having a first classification answer for a URL and a different webserver having a different classification answer for the same URL).

Figure 5:
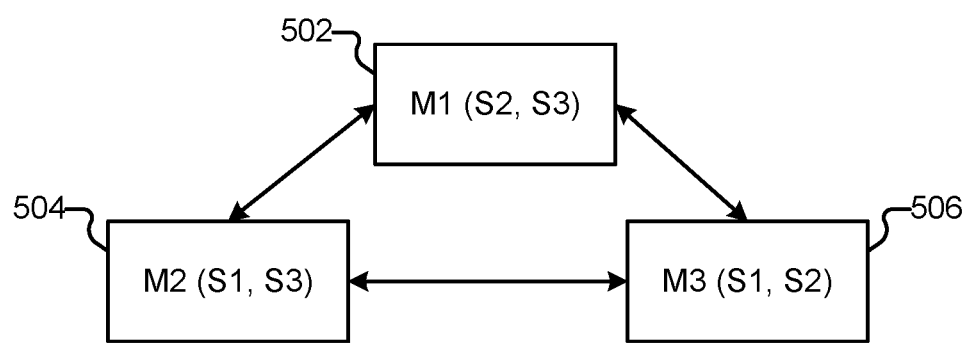
FIG. 5 illustrates an example of a distributed database configuration.

Another way of addressing this situation is for URL classification system 150 to make use of a distributed database. As one example, instead of using a single database instance (e.g., requiring 48G of memory), a configuration using three database instances could be used (e.g., each requiring 16G of memory). An example of such a configuration is depicted in FIG. 5. The example configuration uses three Redis master nodes (502, 504, and 506). Each Redis master node has two slave nodes. Sharding data into different master nodes can scale memory and write operations. Adding slave nodes to each master node can scale read operations.

Unfortunately, a default Trie data structure does not lend itself to replication. Accordingly, in various embodiments, the following infrastructure (or embodiments thereof) are used. While a particular infrastructure embodiment is described below it is to be understood that other infrastructure (e.g., using different tools such as different queue systems or database systems) can also be used, as applicable.

In various embodiments, when crawler infrastructure 164 processes URLs (e.g., categorizing new URLs or refreshing the categorization of existing URLs), crawler infrastructure 164 publishes the URLs and associated categorization to Kafka queue 174 (instantiated, in some embodiments, using a Kafka cluster). A consumer 176 (e.g., implemented in Python) pulls from the Kafka topic and provides the URL/categorization to a RabbitMQ cluster 178 which supports priority. In various embodiments, the RabbiqMQ is sharded into 64 shards. Other numbers of shards can also be used as applicable. Consumer 176 is responsible for reversing the hostname of a given URL in the Kafka queue (e.g., "foo.paloaltonetworks.com" into "com.paloaltonetworks.com") and determining the TLD and most significant portion of the hostname (e.g., "com.paloaltonetworks", also referred to herein as the "TLD+1"). As applicable, consumer 176 can also perform validation before providing the URL/categorization to the applicable sharded RabbitMQ (e.g., RabbitMQ[0], RabbitMQ[16], or RabbitMQ[63]). All URLs for a given hostname (e.g., google.com or tumblr.com) will be sent to the same shard (e.g., RabbitMQ[1] or RabbitMQ[45]). Each of the queues in RabbitMQ cluster 178 has an associated updater worker (e.g., update worker 180) which reads data from its RabbitMQ and provides updates to Redis cluster 182 (e.g., by performing lookups, constructing keys, obtaining direct children, etc.).

In various embodiments, URL categorization information is stored in Redis cluster 182 using Redis Hashes. By using a distributed key-value data store, data storage can be horizontally scaled as can read/write operations. By using TLD+1 as a data distribution key (e.g., Kafka partition key), data locality can be ensured while maintaining a reasonable level of data distribution. Data for the same web sites will always be stored on the same node while data for different web sites will be distributed across different nodes. Further, URLs under the same TLD+1 will be processed by the same worker, avoiding race conditions and improving efficiency. In various embodiments, direct child words are stored in a hash table of 64 slots (ch_0 to ch_63). This reduces the amount of data transfer to and from the database when child words are added/removed/updated. For domains such as tumblr.com and reddit.com which have many direct children, using such a hash table ensures that only $1/64^{th}$ of the direct child words will be written during such updates.

An example data structure is shown in FIG. 6. The key (602) is a hash key, and its formation is described in more detail below. Field 1 (604) "dchn" contains an integer corresponding to the number of direct children. Field 2 (606) "chn" contains an integer corresponding to the total number of children. Field 3 (608) "cat" contains the category or categories (e.g., up to four categories).

In various embodiments, URL classification system 150 makes use of bitmaps where the number of direct children are within a threshold number (e.g., more than 50 and fewer than 100,000). Appliances will query URL classification system 150 when a child URL is a bitmap hit. If a child is not a bitmap hit, its categorization is that of its parent. Field 4 (610) "szbmp" contains the size (in bytes) of the Bloom filter bitmap constructed from direct children. Field 5 (614) "bmp" contains the bitmap as a byte array for direct children. One approach to constructing the Bloom filter bitmap is by using four hash values for each direct child. As one example, a first (h1) and second (h2) hash are taken (using any appropriate hashing technique). A third (h3) and fourth (h4) hash are then computed from h1 and h2, for example, as:

$$h3=h1+2*h2$$

$$h4=h1+3*h2$$

For each of the four hash values, the value is computed as the respective integer from 1 to 4 modulo the hash size, where the hash size is given as 8*szbmp. Since the bitmap size is such that there are at least eight bits (one byte) for each direct child, the bitmap will have at most 50% bits populated (i.e., fewer than half of the bits in the bitmap will be 1). This means that a random word has at most a $(1/2)^4=1/16$ chance to be a Bloom filter hit. In one scenario (e.g., where dchn=65 and szbmp=128), the bitmap will be approximately 25% populated, resulting in a lower Bloom filter hit rate $(1/4)^4=1/256$ chance. The size of the bitmap can be further increased to reduce the need for appliance 102 to query URL classification system 150, at the cost of increasing memory usage on appliance 102. For example, the size of the bitmap can be imposed to be at least 1.5*dchn bytes. In this scenario, the chance for a random string to have a Bloom filter hit is less than $1/3^4=1/81$. Namely, for approximately 81 such URLs, appliance 102 will have to query URL classification system 150 only once. Field 6 (616) "ver" contains an 8-bit version number. It starts at 1 and is incremented any time a change is made to the URL or its direct children. When ver reaches 255 and is incremented again, it restarts at 1, not 0, as 0 is reserved for the case where there has been no update to the direct children since initial load. The ver is used to allow URL classification system 150 to update appliance 102 with a new bitmap or list of direct children when the ver on URL classification system 150 differs from the ver included by appliance 102 when performing a query.

A bitmap allows a device, such as appliance 102, to filter off most URLs that are not present in Redis cluster 182. When appliance 102 gets a URL, e.g., "c1.ab.com/p1/p2/p3/p4," appliance 102 looks into its trie and finds a best match to be "c1.ab.com/p1/p2/p3." It computes four hash values for "/p4" and looks up the bitmap for "c1.ab.com/p1/p2/p3." If it is a miss (e.g., for at least one hash value, the corresponding bit in bmp is 0), appliance 102 can safely assume the best match category. If it is a hit (for all four hash values, the corresponding bits in bmp are 1), appliance 102 queries URL classification system 150. When querying system 150, appliance 102 sends the full URL, the best-match URL ("c1.ab.com/p1/p2/p3") and the ver.

Field 7 (618) "exp" contains an expiration of the URL categorization data. Different kinds of categories may have different expiration values (e.g., benign vs. malicious categories). Field 8 (620) "tstmp" contains a timestamp for the URL categorization information. Field 9 (622) "cflag" contains control flags. This can be used to flag, for example, popular sites for which URL classification system 150 can elect to send a bitmap even when dchn exceeds 10,000. For a URL that has 20,000 direct children, if a $1/81$ false Bloom filter hit rate is used, the amount of memory needed by the Bloom filter bitmap is approximately 30 KB, much smaller than the amount of memory needed to store 20,000 direct children. Field 10 (626) "ch300" contains a list of up to 300 children usable for compatibility with legacy appliances. Field 11 (628) "ch(x)" (where "x" is in the chard space, such as 0-63) is the children sharded into (e.g.) 64 fields.

Figure 7:
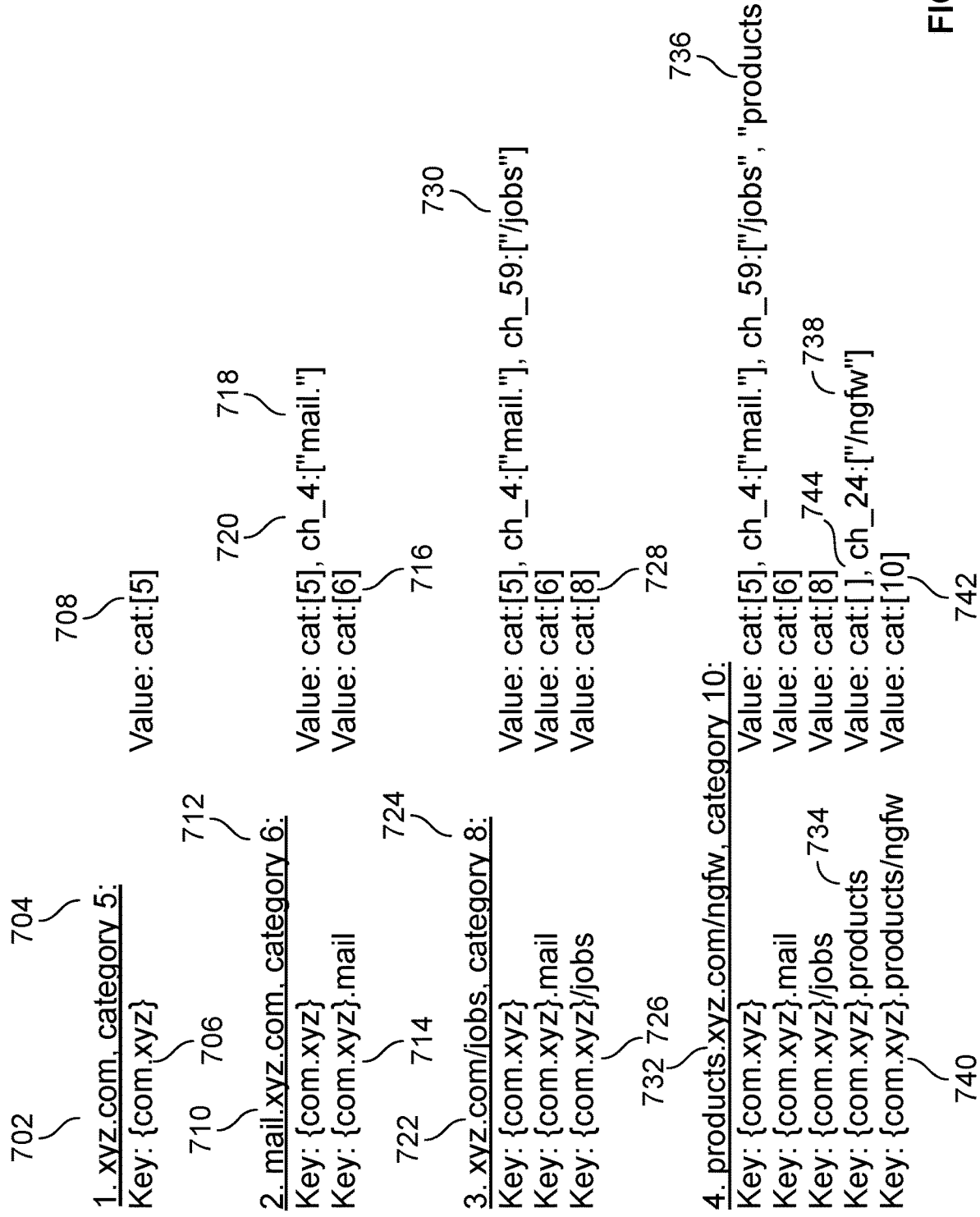
FIG. 7 illustrates the evolution of related key/pair values when four new URLs for a website are published.

The key-value data store provides category information for a URL and its child URLs. FIG. 7 illustrates how new URLs and their categorizations are inserted, and in particular, the evolution of related key/pair values when each of four new URLs for a website are published (e.g., by crawler infrastructure 164 to Kafka queue 174). In FIG. 7, receipt of each of the four respective URLs (and their respective categorizations) are enumerated, with the state of the database after insertion indicated directly below.

First, suppose URL 702 ("xyz.com") has a categorization of 5 (704). A Key for the TLD+1 ("com.xyz") is inserted, with a value of the categorization (708).

The second URL processed (710) is a child of URL (702). It has a different categorization (712) from its parent and has a new key (714) inserted with its category (716). In addition, the existence of URL 710 as a child of 702 is associated with URL 702 by adding an additional value (718). Region 720 indicates which hash table slot stores the child.

The third URL processed (722) is also a child of URL 702, but has a different categorization (724) from its parent. A new key (726) is inserted for it with its category (728). In addition, the existence of URL 722 as a child of 702 is associated with URL 702 by adding an additional value (730). No changes are made to the key/value pair for URL 710 as a result of the insertion of categorization information for URL 722.

The fourth URL processed (732) is also a child of URL 702, however it is not a direct child. An intervening word (".products") is missing. In order to insert categorization information for URL 732, an intervening key/value pair is inserted for the missing direct child of URL 702, and associated with URL 702 (736). The intervening word does not itself have a categorization, and so that value is left empty (744). In some embodiments, where a category for a URL is not specified, the category is obtained from its parent. URL 732 is added as a child of the intervening word (738), and a key/value pair for URL 732 is also added (740, 742).

As previously mentioned, the TLD+1 level domain is used as a Kafka partition key. URLs under the same TLD+1 will be processed by the same worker, avoiding race conditions and improving efficiency. Updates (e.g., to the categorizations of URLs 702, 710, 722, or 732) for the same TLD+1 are serialized.

Figure 8:
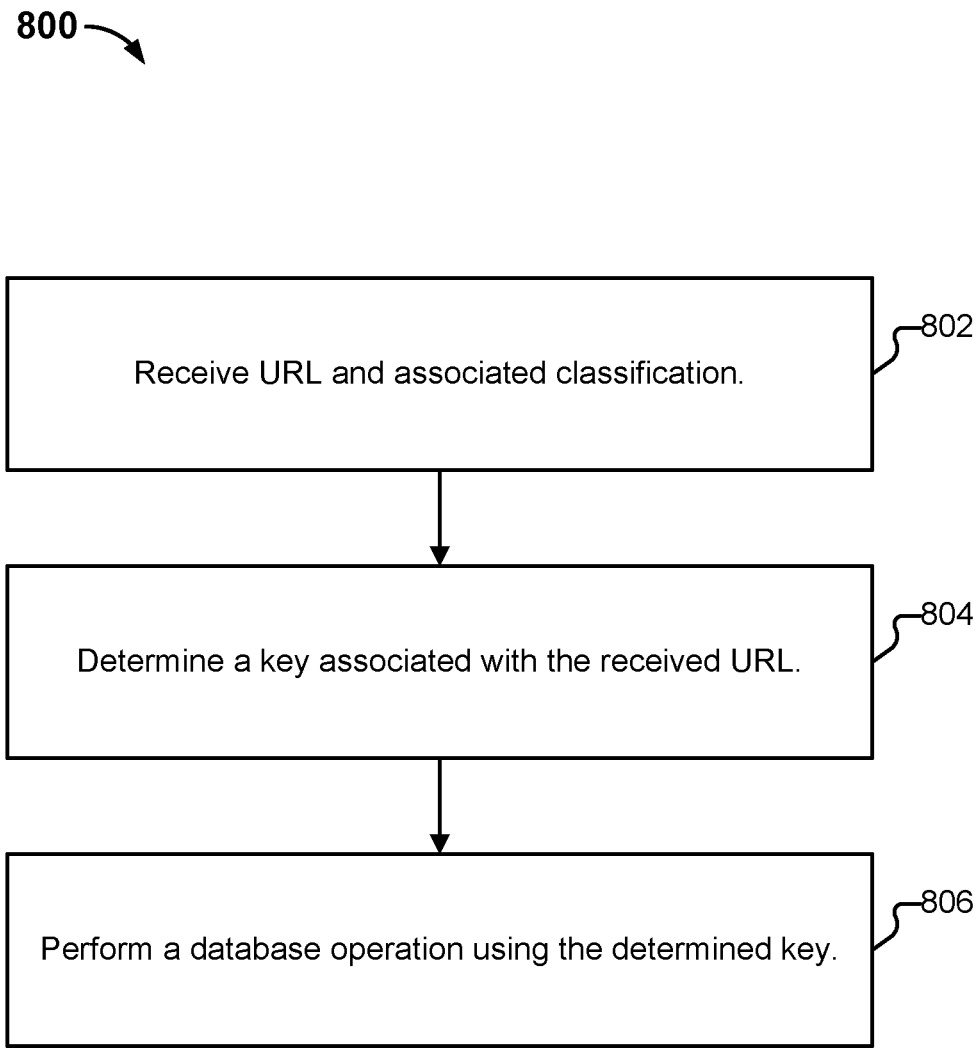
FIG. 8 illustrates an embodiment of a process for maintaining URL categorization information.

FIG. 8 illustrates an embodiment of a process for maintaining URL categorization information. In various embodiments, process 800 is performed by URL classification system 150. The process begins at 802 when a URL and associated classification for the URL is received. As one example, a URL and associated classification is received at 802 when crawler infrastructure 164 publishes a URL and categorization information to Kafka queue 174. At 804, a key associated with the received URL is determined. As one example of the processing performed at 804, key 706 is determined using URL 702. As another example of the processing performed at 804, keys 734 and 740 are determined using URL 732. Finally, at 806, an operation is performed on a database using the determined key. Examples of such operations include inserting a new key into the database, removing a key from the database, updating values associated with an existing key, and querying the database.

C. Responding to Queries

As mentioned above, websites vary widely in the number of nodes in their suffix trees. In various embodiments, URL classification system 150 is configured to provide different responses to URL classification queries for a domain based on the size of the domain's suffix tree and/or other criteria.

FIG. 9 illustrates a set of database keys that can be generated from the URL, "c1.ab.com/p1/p2/p3/p4" after reversing the hostname octets (to "com.ab.c1/p1/p2/p3/p4"). For each key, Redis cluster 182 stores all direct children, along with other data (such as categorization, if it exists). For example, for the key "com.ab," its direct child is ".c1." For the key "com.ab.c1," its direct child is "/p1." If the URL, "c1.ab.com/p1/p2/p3a/p4a," is added, the key "c1.ab.com/p1/p2" will have two direct children: "/p3" and "/p3a."

Suppose a request is received by URL classification system 150 from appliance 102 for classification of "c1.ab.com/p1/p2/p3/p4." URL classification system 150 will check Redis cluster 182 for each of the seven keys shown in FIG. 9. If none of the seven keys has a malicious categorization (e.g., Phishing, Malware, or C2), the category for the longest URL is returned. If one or more of the keys has a malicious categorization, the category of the URL with the most malicious categorization is returned (e.g., where C2 is considered more malicious than Malware and Malware is considered more malicious than Phishing).

Suppose the matching URL is "c1.ab.com/p1/p2/p3." In various embodiments, URL classification system 150 returns the category and the URL for the match ("com.ab.c1/p1/p2/p3"), along with the following data, based on the structure of the domain's suffix tree. The thresholds for determining which case applies are examples and can be adjusted (e.g., from 50 to 100 or otherwise) as applicable:

Case 1: If the total number of child URLs under "com.ab.c1/p1/p2/p3" is fewer than 51 (chn<=50):

URL classification system 150 returns information for all child URLs (i.e., URLs that start with "com.ab.c1/p1/p2/p3"). Note that "com.ab.c1/p1/p2/p3a" is not a direct child of "com.ab.c1/p1/p2/p3;" it is a direct child of "com.ab.c1/p1/p2." The response also includes a flag (completeness) indicating all children under "c1.ab.com/p1/p2/p3" are included. Examples of domains which would fall into Case 1 include facebook.com and docs.google.com.

Case 2: If the total number of direct children under "com.ab.c1/p1/p2/p3" is fewer than 51 (dchn<=50):

URL classification system 150 returns information on a complete list of all the direct children of "com.ab.c1/p1/p2/p3." The response also includes a flag (direct completeness) indicating that all direct children under "c1.ab.com/p1/p2/p3" are included. Examples of domains which would fall into Case 2 include reddit.com.

Case 3: If "com.ab.c1/p1/p2/p3" has more than 50 but fewer than 10,000 direct children (50<dchn<10,000):

URL classification system 150 returns a Bloom filter bitmap constructed from the direct children (one of which is "/p4"). The size of the bitmap (in bytes) is a multiple of 64. The bitmap is populated by using four hash values for each direct child of "c1.ab.com/p1/p2/p3." Examples of domains which would fall into Case 3 include google.com and yahoo.com.

Case 4: If "com.ab.c1/p1/p2/p3" has 10,000 or more direct children (dchn>9,999):

URL classification system 150 returns only the best match URL. An example of a domain which would fall into Case 4 is tumblr.com.

For each of the aforementioned cases, URL classification server 150 also returns an 8-bit unsigned integer (ver). As with vbmp, the integer starts from 1 and it is incremented when there is a change with children (when chn<=50) or the direct children (when chn>50) of "com.ab.c1/p1/p2/p3." When the integer reaches 255, it becomes 1 (not 0) the next time it is incremented again. This version number is used by URL classification system 150 to determine whether appliance 102 has the latest data for the direct children of "/p3."

The following is example response data corresponding to various cases:

When a Bloom filter bitmap is used (chn>50):
"url": "c1.ab.com/p1/p2/p3"
"cat": [30,41]
"dchn": 55
"flags": 0
"chl": [ ] (empty list)
"szbmp": 64
"bmp": "02452AB3 . . . F921" (128 bytes for 64-byte bitmap)
"ver": 16 (0<ver<256)

When a Bloom filter bitmap is not used (chn<=50):
"url": "c1.ab.com/p1/p2/p3"
"cat": [30,41]
"dchn": 38
"flags": 2 (direct children)
"chl": ["/p4", . . . ] (list of all dchn children)
"szbmp": 0
"bmp": " "
"ver": 16 (0<ver<256)

In the above, "szbmp" is the Bloom filter bitmap size in bytes. "bmp" is the Bloom filter bitmap. Each byte in the Bloom filter bitmap is represented as two printable hexadecimal characters. For example, "\x5a" is written as "5A"). "chl" is the list of direct children of "/p3". "ver" is the 8-bit version number discussed above.

Appliance 102 converts the above 128-byte string for bmp to the 64-byte uint8_t array and stores the latter in memory for the node "c1.ab.com/p1/p2/p3."

Once appliance 102 processes URL classification system 150's response to the above query, when appliance 102 sees another URL (e.g., "c1.ab.com/p1/p2/p3/px"), it has either the complete list of /p3's direct children (when dchn<=50) or the Bloom filter bitmap (when dchn>50). If "/px" is not among the children or it is a Bloom filter miss, the device is expected to assign the category of "c1.ab.com/p1/p2/p3" to the URL without querying URL classification system 150. Otherwise ("/px" is among the children or it is a Bloom filter hit), appliance 102 queries URL classification system 150 for this URL. The query includes the full URL as well as a list of "ver" values for all parents:

"url": "c1.ab.com/p1/p2/p3/px"
"vers": "0,29,23,18,17,16"

Here "0" in ver is for "com," 29 for "ab.com," 23 for "c1.ab.com," 18 for "c1.ab.com/p1," 17 for "c1.ab.com/p1/p,2" and 16 for "c1.ab.com/p1/p2/p3."

URL classification system 150 will process the query and compare the "ver" values in the query against the corresponding values in URL classification system 150 and update appliance 102 with new data if one or more values differ. For example, if URL classification system 150 has "19" for "c1.ab.com/p1," its response will include new data for the direct children of "c1.ab.com/p1." Appliances can also elect not to include the list of versions in their requests. In this case, URL classification system 150 will not update the device with the data for the parents of the matching URL.

Below are two examples, based on whether or not a Bloom filter bitmap is used.

When a Bloom filter bitmap is used (e.g., dchn>50):
"url": "c1.ab.com/p1/p2/p3"
"cat": [30,41]
"dchn": 55
"chl": [ ]
"szbmp": 64
"bmp": " " (Bloom filter bitmap omitted)
"ver": 17 (0<ver<256)
"url": "c1.ab.com/p1"
"cat": [32]
"dchn": 10
"chl": [ ]
"szbmp": 64
"bmp": "22B523C1 . . . E928"
"ver": 19

When a Bloom filter bitmap is not used (e.g., chn<=50):
"url": "c1.ab.com/p1/p2/p3"
"cat": [30,41]
"chn": 38
"chl": [ ] (List of direct children omitted)
"szbmp": 0
"bmp": " "
"ver": 17 (0<ver<256)
"url": "c1.ab.com/p1"
"cat": [32]
"dchn": 10
"chl": [ ]
"szbmp": 64
"bmp": "22B523 C1 . . . E928"
"ver": 19

Appliance 102 can choose to cache the URL ("c1.ab.com/p1/p2/p3/px") to avoid querying URL classification system 150 again for this URL. Appliance 102 can also choose not to cache the URL to save memory. If URL classification system 150 has an exact match for the URL, appliance 102 will typically cache the URL and the category info.

The following is an example case of where use of a bitmap can be particularly helpful. Suppose "x.com/a/b" has many direct children (e.g., "x.com/a/b/c1" . . . "x.com/a/b/c99") and appliance 102 receives a corresponding bitmap. If appliance 102 receives a request for access to "x.com/a/b/c100," appliance 102 will first check whether there is a bitmap hit for "/c100." If there is no hit, the category for "x.com/a/b/c100" is that of the parent ("x.com/a/b") and there is no need for appliance 102 to query URL classification system 150. Otherwise, appliance 102 queries URL classification system 150.

When receiving a query of "x.com/a/b/c100" from appliance 102, URL classification system 150 performs a lookup in Redis cluster 182. If Redis cluster 182 has the node, this URL will be included in the response along with a category, if available (the category can also be empty). If Redis cluster 182 does not have the node, URL classification system 150 will best-match to the parent node ("x.com/a/b") for the category and the parent node's data will be included in the response (which contains a bitmap). Now URL classification system 150 will check if "/c100" is a bitmap hit. If "/c100" is a bitmap hit, "x.com/a/b/c100" will be included in the response with an empty category. Data appliance 102 can cache this information to avoid future queries for the same URL. If there is no bitmap hit, "x.com/a/b/c100" will not be included in the response. Data appliance 102 will find that there is no bitmap hit for "/c100" and therefore best-match to the parent ("x.com/a/b/c100") for the category.

Typically, data appliance 102 will not query URL classification system 150 if "/c100" is not a bitmap hit. However, there are some scenarios where this can happen. As one example, data appliance 102 may not have data for the parent node. As another example, data appliance 102's data for the parent node may be outdated (i.e., URL classification system 150 has received updates and "/c100" becomes a bitmap hit).

Figure 10:
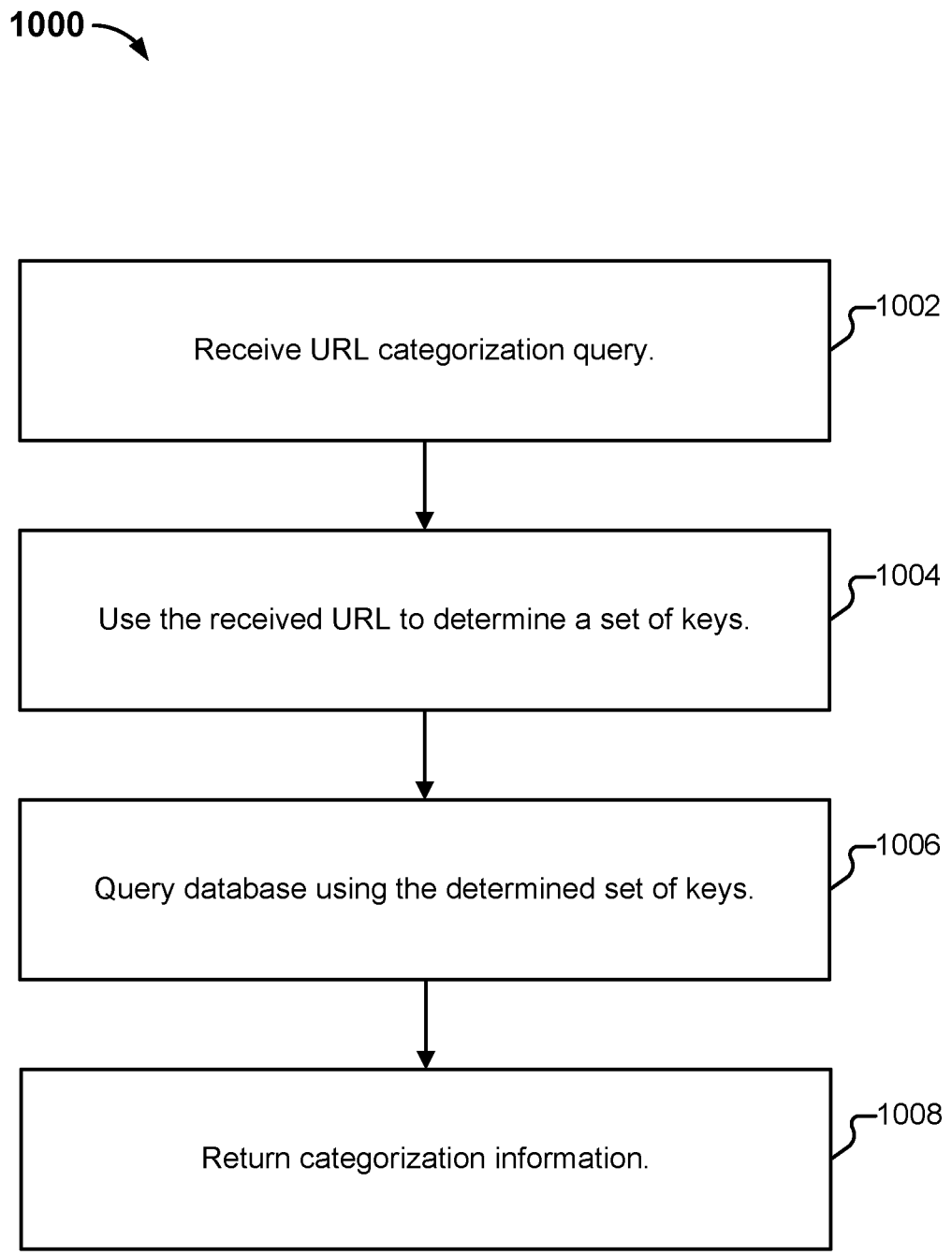
FIG. 10 illustrates an example of a process for responding to URL categorization requests.

FIG. 10 illustrates an example of a process for responding to URL categorization requests. In various embodiments, process 1000 is performed by URL classification system 150. The process begins at 1002 when a URL categorization query is received. As one example, a URL categorization query is received by URL classification system 150 (e.g., via web server 172) from appliance 102 when appliance 102 lacks URL classification information for a site client device 104 attempts to access. At 1004, URL classification system 150 uses the query to determine a set of keys. As one example, if the query was for "c1.ab.com/p1/p2/p3/p4," the keys shown in FIG. 9 are an example of keys that could be determined at 1004. At 1006, Redis cluster 182 is queried using the keys. One approach to performing the query is to get all matches from the keys determined at 1004, and then, recursively, query immediate children until a leaf node (no immediate children) is reached.

And, at 1008, categorization information is returned to data appliance 102. As described above, a variety of approaches can be used to determine which categorization information is returned. For example, where multiple keys are present in Redis cluster 182, the category for the longest URL can be returned, the category with the most malicious categorization can be returned, etc. Further, as also explained above, the amount of categorization information (e.g., for other URLs associated with the query) can be varied as applicable (e.g., based on the size of the suffix tree associated with the domain).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a Uniform Resource Locator (URL) and a categorization associated with the URL, wherein the received URL comprises a hostname portion and path portion, and wherein the hostname portion of the received URL comprises a plurality of segments separated by one or more delimiters;
determine a key associated with the received URL, including by reversing an order of the plurality of segments in the hostname portion of the received URL; and
perform a first operation on a distributed database using the determined key, wherein:
the distributed database comprises a plurality of master nodes, the distributed database implements a suffix tree using key-value pairs, direct child words are stored in a hash table, the distributed database uses a top-level-domain appended to a first portion of the hostname portion as a partition key, the first operation is performed at a first master node, an additional operation associated with the first operation associated with the first portion of the hostname portion is also performed at the first master node, and a second operation, associated with a second hostname portion of a different URL, is performed at a second master node; and a memory coupled to the processor and configured to provide the processor with instructions.

2. The system of claim 1, wherein the first operation includes inserting the categorization into the distributed database.

3. The system of claim 2, wherein inserting the categorization includes inserting a particular key-value pair into the distributed database.

4. The system of claim 1, wherein the first operation includes changing a value associated with the key in the distributed database.

5. The system of claim 1, wherein the first operation includes removing a particular key-value pair from the distributed database.

6. The system of claim 1, wherein the first operation includes querying the database.

7. A method, comprising:

receiving a Uniform Resource Locator (URL) and a categorization associated with the URL, wherein the received URL comprises a hostname portion and path portion, and wherein the hostname portion of the received URL comprises a plurality of segments separated by one or more delimiters;

determining a key associated with the received URL, including by reversing an order of the plurality of segments in the hostname portion of the received URL; and performing a first operation on a distributed database using the determined key, wherein:

the distributed database comprises a plurality of master nodes, the distributed database implements a suffix tree using key-value pairs, direct child words are stored in a hash table, the distributed database uses a top-level-domain appended to a first portion of the hostname portion as a partition key, the first operation is performed at a first master node, an additional operation associated with the first operation associated with the first portion of the hostname portion is also performed at the first master node, and a second operation, associated with a second hostname portion of a different URL, is performed at a second master node.

8. The method of claim 7, wherein the first operation includes inserting the categorization into the distributed database.

9. The method of claim 8, wherein inserting the categorization includes inserting a particular key-value pair into the distributied database.

10. The method of claim 7, wherein the first operation includes changing a value associated with the key in the distributed database.

11. The method of claim 7, wherein the first operation includes removing a particular key-value pair from the distributed database.

12. The method of claim 7, wherein the first operation includes querying the distributed database.

13. A computer program product embodied in a tangible computer readable storage medium and comprising computer instructions for:

receiving a Uniform Resource Locator (URL) and a categorization associated with the URL, wherein the received URL comprises a hostname portion and path portion, and wherein the hostname portion of the received URL comprises a plurality of segments separated by one or more delimiters;

determining a key associated with the received URL, including by reversing an order of the plurality of segments in the hostname portion of the received URL; and performing a first operation on a distributed database using the determined key, wherein:

the distributed database comprises a plurality of master nodes, the distributed database implements a suffix tree using key-value pairs, direct child words are stored in a hash table, the distributed database uses a top-level-domain appended to a first portion of the hostname portion as a partition key, the first operation is performed at a first master node, an additional operation associated with the first operation associated with the first portion of the hostname portion is also performed at the first master node, and a second operation associated with a second hostname portion of a different URL is performed at a second master node.

14. The computer program product of claim 13, wherein the first operation includes inserting the categorization into the distributed database.

15. The computer program product of claim 14, wherein inserting the categorization includes inserting a particular key-value pair into the distributed database.

16. The computer program product of claim 13, wherein the first operation includes changing a value associated with the key in the distributed database.

17. The computer program product of claim 13, wherein the first operation includes removing a particular key-value pair from the distributed database.

18. The computer program product of claim 13, wherein the first operation includes querying the distributed database.

* * * * *